US011366727B2

(12) United States Patent
Dillaman

(10) Patent No.: US 11,366,727 B2
(45) **Date of Patent: *Jun. 21, 2022**

(54) DISTRIBUTED STORAGE ACCESS USING VIRTUAL TARGET PORTAL GROUPS

(71) Applicant: Red Hat, Inc., Raleigh, NC (US)

(72) Inventor: Jason Dillaman, Richmond, VA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,745

(22) Filed: Oct. 26, 2020

(65) Prior Publication Data

US 2021/0064488 A1 Mar. 4, 2021

Related U.S. Application Data

(63) Continuation of application No. 16/042,222, filed on Jul. 23, 2018, now Pat. No. 10,817,391.

(51) Int. Cl.

| | |
|---|---|
| ***G06F 11/20*** | (2006.01) |
| ***G06F 3/06*** | (2006.01) |
| ***H04L 69/14*** | (2022.01) |

(52) U.S. Cl.

CPC ............ *G06F 11/201* (2013.01); *G06F 3/061* (2013.01); *G06F 3/067* (2013.01); *G06F 3/0617* (2013.01); *G06F 3/0635* (2013.01); *G06F 3/0662* (2013.01); *G06F 11/2092* (2013.01); *H04L 69/14* (2013.01); *G06F 2201/815* (2013.01)

(58) Field of Classification Search

CPC .. G06F 11/201; G06F 11/2092; G06F 3/0662; G06F 3/0635; G06F 3/0617; G06F 3/067; G06F 3/061; G06F 2201/815; G06F 11/3034; G06F 11/3409; G06F 11/2005;

(Continued)

(56) References Cited

U.S. PATENT DOCUMENTS

| | | | |
|---|---|---|---|
| 8,626,967 | B1 | 1/2014 | Naik et al. |
| 10,454,810 | B1 | 10/2019 | Driscoll et al. |

(Continued)

OTHER PUBLICATIONS

Tracy, Scott, "Target Port Group Support (TPGS) in the Solaris OS", 2007, http://www.oracle.com/technetwork/server-storage/solaris/tpgs-support-136354.html, 4 pages.

(Continued)

*Primary Examiner* — Farley Abad
(74) *Attorney, Agent, or Firm* — Lowenstein Sandler LLP

(57) ABSTRACT

A method disclosed herein may include receiving a portal group from a node of a distributed storage system, the portal group comprising a plurality of network portals for accessing a storage unit, and transmitting data of the portal group to a first client and to a second client, wherein data transmitted to the first client and data transmitted to the second client each identify the plurality of network portals and indicate a different preferred network portal. The method may further include receiving a request from the first client to initiate a storage session that uses one of the plurality of network portals, establishing the storage session, wherein the storage session comprises multiple paths to the storage unit over at least two of the plurality of network portals, and providing data of the storage unit to the first client using the storage session.

20 Claims, 7 Drawing Sheets

500

START

502 Receiving, by a processing device, a portal group from a node of a distributed storage system, the portal group comprising a plurality of network portals for accessing a storage unit 504 Transmitting data of the portal group to a first client and to a second client, wherein data transmitted to the first client indicates a first network portal is preferred and data transmitted to the second client indicates a second network portal is preferred 506 Receiving, by the processing device, a request from the first client to initiate a storage session that uses the first network portal 508 Establishing the storage session, wherein the storage session comprises multiple paths to the storage unit over at least two of the plurality of network portals 510 Providing data of the storage unit to the first client using the storage session

END

(58) Field of Classification Search
CPC ... H04L 69/14; H04L 67/141; H04L 67/1038; H04L 67/1097
See application file for complete search history.

(56) References Cited

U.S. PATENT DOCUMENTS

| | | | | |
|---|---|---|---|---|
| 2013/0024639 | A1 | 1/2013 | Yamamoto et al. | |
| 2015/0169414 | A1 * | 6/2015 | Lalsangi | G06F 11/2092 707/610 |
| 2015/0324126 | A1 | 11/2015 | Nakajima | |
| 2016/0179637 | A1 | 6/2016 | Winokur | |
| 2018/0335945 | A1 | 11/2018 | Bulmer et al. | |

OTHER PUBLICATIONS

Dawar, Ashwin, "Asymmetric Logical Unit Access", Sep. 2004, 20 pages.

* cited by examiner

DISTRIBUTED STORAGE ACCESS USING VIRTUAL TARGET PORTAL GROUPS

RELATED APPLICATIONS

This application is a continuation application of co-pending U.S. patent application Ser. No. 16/042,222, filed Jul. 23, 2018, which is herein incorporated by reference.

TECHNICAL FIELD

The present disclosure is generally related to data storage systems, and is more specifically related to exporting content of a distributed storage system to external devices.

BACKGROUND

Modern computers often store data in a distributed data store to enhance the access, redundancy, and capacity of data storage devices. The distributed data store may include multiple storage nodes that function to store, organize, and provide access to data. The distributed data store may include a server portion that manages the data and a client portion that provides access to the data. The client portion may include code (e.g., client module) that enables a client device to access data of the distributed data store. The client device may contribute storage resources to the distributed data store and access the data or may access the data without contributing storage resources to the distributed data store. Devices that are absent the client portion of the distributed data store may be unable to access data stored within the distributed data store.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
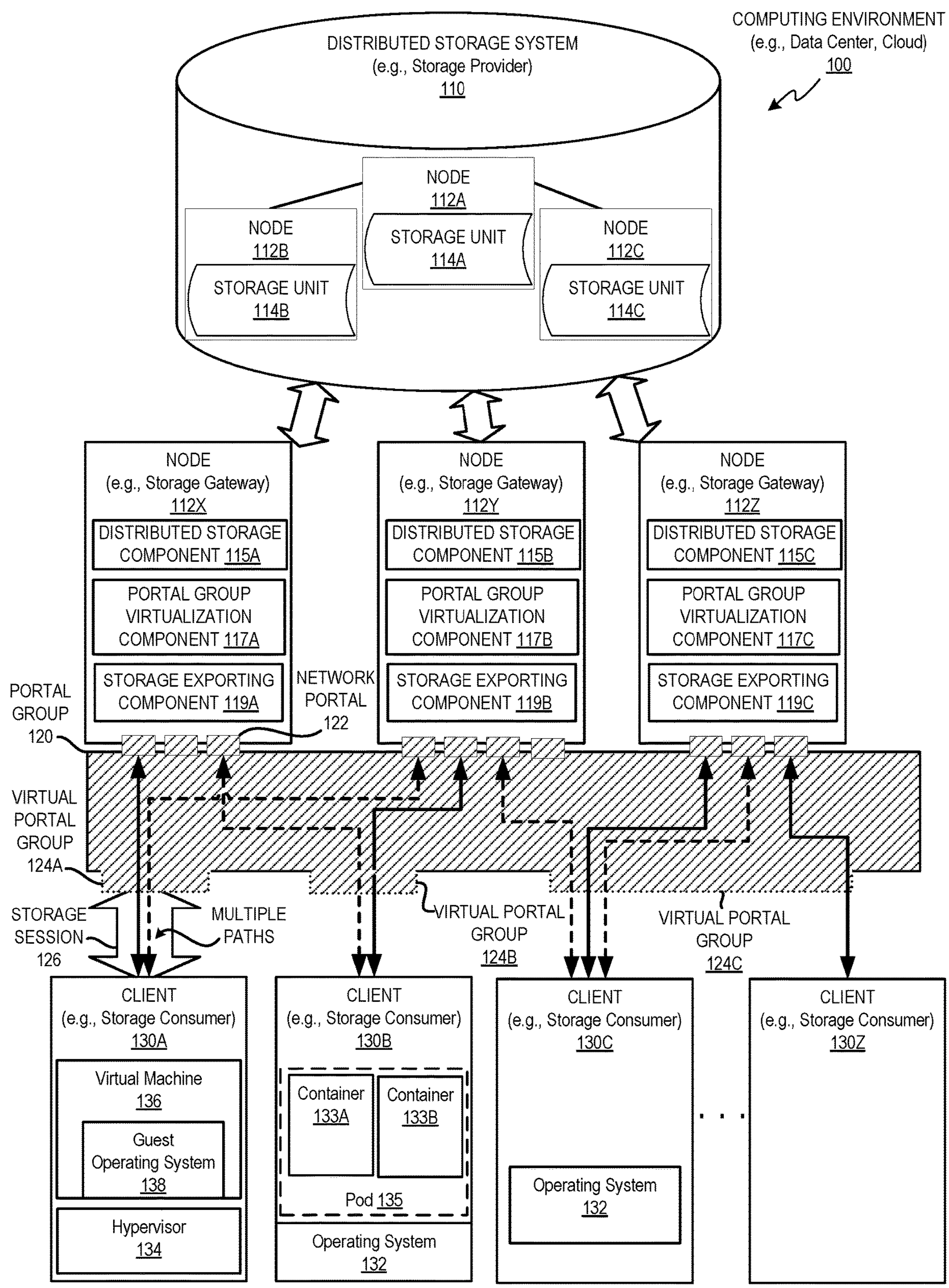
FIG. 1 depicts a high-level block diagram of an example computing environment, in accordance with one or more aspects of the present disclosure.

Distributed storage systems often incorporate the features of distributed data stores and enable multiple clients to access and modify data of the distributed storage system. The clients often include code designed to interact with the distributed storage system and may provide a client with multiple paths to access the data of the distributed storage system. Each of the multiple paths may traverse a different set of physical devices, virtual devices, or a combination thereof. The multiple paths may enhance performance, reliability, or a combination thereof. For example, the multiple paths may enable a client to spread its input/output (I/O) requests across the multiple paths and if one of the multiple paths fails, the client can still access the data using the other path. Enabling a client to access data in a distributed storage system over multiple paths is a complex task that traditionally requires the development and integration of a distributed storage client into the client.

To encourage more widespread use of the distributed storage system the distributed storage system may support exporting data using one or more standardized storage export technologies. The standardized storage export technology may enable a client that is absent the distribute storage client to access data of the distributed storage system using a storage gateway. The storage gateway may be a node of the distributed storage system that exports data to clients that are unaware of the distributed storage system or are unable or unauthorized to access the data directly from the distributed storage system. The standardized storage export technology may export the data as block level storage (e.g., data blocks), file level storage (e.g., data files), record level storage (e.g., database records), object based storage, other storage, or a combination thereof. The standardized storage export technology may be built in or generally available to many devices but may not provide the same features available to a client device when using the distributed storage client. For example, the standardized storage export technology may not enable the client to access data concurrently using multiple paths due to inherent race conditions that may arise in the distributed storage system and may cause data corruption, data loss, other flaws, or a combination thereof.

Aspects of the present disclosure address the above and other deficiencies by providing technology that enables the distributed storage system to provide concurrent access over multiple paths to a group of clients using standardized storage export technology. In one example, the technology disclosed herein may enable a subset of the nodes of a distributed storage system to function as storage gateways. The storage gateways may provide multiple paths for clients to access a storage unit. In one example, the data of the storage unit may be stored across multiple nodes in the distributed storage system and be presented to a client as block level storage associated with Logical Unit Numbers (LUNs). Each of the nodes may determine a portal group that includes multiple network portals and characteristics of the network portals. The network portals may be associated with one or more of the storage gateways. The characteristics may be based on physical or virtual attributes of the devices providing access to the storage and may include bandwidth, latency, other characteristic, or a combination thereof. The node may transmit information about the portal group to multiple clients that will use the information to determine which network portals to use to access the stored data.

Sending the same portal group data to each client may result in each client selecting the same network portal. To enhance load distribution, the node may virtualize the portal groups to provide each of the clients with a different view of the same portal group. In one example, the virtualized portal group may include the same network portals but the characteristics based on the physical or virtual attributes may be manipulated for different clients. The clients may be unaware that they are operating using a virtualized portal group and may use the virtualized portal group when establishing a storage session. Because each virtualized portal group is different, the collective group of clients may use multiple paths over multiple different network ports that span one or more storage gateways when accessing the data of the distributed storage system.

The systems and methods described herein include technology that enhances the accessibility, performance, and fault tolerance of distributed storage systems. In particular, aspects of the present disclosure may enhance the accessibility of the distributed storage system by enabling devices that are absent a distributed storage client to access the distributed storage system using standardized storage access technology. A computing device may be absent the distributed storage client because the distributed storage client may not support the configuration (e.g., operating system) of the computing device or because the computing environment does not authorize or enable the device to be modified to include the distributed storage client. The technology disclosed herein may enable the devices to concurrently access data of the distributed storage system over multiple paths using a standardized storage access technology (e.g., internet Small Computer Systems Interface (iSCSI), Fibre Channel over Ethernet (FCoE), ATA-over-Ethernet (AoE), other storage access technology, or a combination thereof.

Various aspects of the above referenced methods and systems are described in details herein below by way of examples, rather than by way of limitation. The examples provided below discuss a computing environment where the devices are executed using virtualization technology (e.g., virtual machines or containers), but other examples may include devices that are executed on physical machines that are absent the virtualization technology discussed below (e.g., absent hardware level virtualization or operating system level virtualization).

FIG. 1 illustrates an exemplary computing environment 100 in which implementations of the disclosure may operate. Computing environment 100 may include multiple computing devices associated with one or more cloud environments, data centers, data rooms, other arrangement of devices, or a combination thereof. In one example, computing environment 100 may include a distributed storage system 110 (e.g., storage provider), one or more nodes 112X-Z (e.g., storage gateways), and one or more clients 130A-Z (e.g., storage consumers).

Distributed storage system 110 may store and manage the distribution of data across multiple nodes 112A-C. Distributed storage system 110 may provide access to data via a block-based storage service, file-based storage service, an object based storage service, a record based storage service, or a combination thereof. A block-based storage service may provide access to data at a block level and may appear similar to one or more block level storage devices (e.g., Storage Area Network (SAN) device or array). A file-based storage service may provide access to data at a file level and may appear similar to file level storage devices (e.g., Network Attached Storage (NAS) devices). In one example, distributed storage system 110 may be the same or similar to Ceph, Gluster, Oracle® Automatic Storage Management (e.g., ASM), Hadoop® Distributed File System (HDFS), Andrew File System (AFS), Google® File System (GFS), other data storage system, or a combination thereof that is capable of storing object data (e.g. content) on one or more nodes 112A-C.

Nodes 112A-C may store data and manage the storage functions of distributed storage system 110. Each of the nodes 112A-C may contribute to data storage resources, data processing resources, or a combination thereof. In one example, all of the nodes may provide data storage resources and data processing resources for distributed storage system 110. In another example, one or more of the nodes may provide data processing resources to manage other nodes without providing data storage resources for distributed storage system 110. Each of the nodes may be a separate computing device or may share one or more computing devices. The computing devices may be client devices (e.g., desktops, laptops, and tablets), server devices (e.g., servers of a cluster), data storage devices (e.g., Network Attached Storage (NAS) or Storage Area Network (SAN)), other computing devices, or a combination thereof. Together the nodes may function to create, store, and modify storage units 114A-C.

Storage units 114A-C may be one or more storage blocks, files, records, objects, other data structures, or a combination thereof. Each storage unit 114A-C may be stored by one or more of the nodes 112A-C and may correspond to a data structure that organizes data and identifies portions (e.g., locations) within a storage space. Each of the storage units 114A-C may correspond to object metadata and object content. The object metadata may include identification data, permission data, ownership data, access data, creation data, other data, or a combination thereof. In one example, a storage unit may be a storage block and may be associated with block metadata such as one or more attributes or extended attributes such as identifiers (e.g., LUN), permissions (e.g., read, write execute), ownership, creation time, other attributes, or a combination thereof.

Nodes 112X-Z may be the same or similar to nodes 112A-C and may each function as both a client accessing data of the distributed storage system 110 and as a server exporting the data to other devices. When a node functions to export data access it may be referred to as a storage gateway and may receive and transmit IO requests and responses from one or more clients external to distributed storage system 110. In the example shown in FIG. 1, nodes 112X-Z may include respective distributed storage components 115A-C, portal group virtualization components 117A-C, and storage exporting components 119A-C. Distributed storage components 115A-C may enable a respective node to access data of one or more storage units 114A-C from distributed storage system 110. Portal group virtualization components 117A-C may enable the respective node to virtualize the storage interfaces to the distributed storage system to dispense the load across one or more storage gateway nodes. Storage exporting components 119A-C may enable the respective node to provide the data of the distributed storage system 110 to one or more of the clients 130A-Z that are absent a client portion of the distributed storage system. The storage exporting components 119A-C may provide clients 130A-Z with multipath access to the data by constructing and sharing versions of a portal group 120.

Portal group 120 may be a data structure that indicates one or more network portals 122 capable of providing access to data storage. The data of a portal group 120 may be provided to clients 130A-Z to enable the clients to access one or more storage devices storing the requested data. Portal group 120 may include multiple network portals 122 that may identify particular network interfaces of a node. Each network portal 122 may include one or more network identifiers. The network identifiers may function as a network address at any computer networking layer (e.g., physical layer, network layer, session layer, application layer) and may provide a physical or virtual location that a client can use to communicate. The network identifiers may include internet protocol (IP) identifiers (e.g., IP addresses), media access control (MAC) identifiers (e.g., MAC addresses), port numbers, computer names, domain names, other identifier, or a combination thereof. In one example, network portal 122 may include an IP address and a port number and may be associated with an open socket that listens for incoming TO requests.

Virtual portal group 124A-C may be the same or similar to portal group 120 and may provide different versions of portal group 120 to one or more of the clients 130A-Z. The virtual portal groups 124A-C may provide a virtualized view of the different networking hardware interfaces. As shown in FIG. 1, there may be multiple different virtual portal groups 124A-C that correspond to the same portal group 120. Each virtual portal group may correspond to a particular client (e.g., virtual portal group 124A) or to one or more clients (e.g., virtual portal group 124C). Each virtual portal group 124A-C may provide data indicating a different network portal is a preferred portal and may cause the nodes to select different network portals as the primary network portal for accessing data of the distributed storage system 110.

Portal group 120 and each of the virtual portal groups 124A-C may be target portal groups (TPGs) that comply with an iSCSI protocol. A target portal group may identify a group of network portals that function as targets for the iSCSI protocol. The iSCSI protocol identifies both targets (e.g., iSCSI servers) and initiators (e.g., iSCSI clients). The targets receive and process 10 requests from initiators. Each IO request includes one or more SCSI commands that are associated with one or more storage units and may involve operations that access, modify, create, remove, other operation, or a combination thereof. The target portal group may include network portals for multiple reasons. First, the iSCSI protocol may permit a single session between a specific iSCSI initiator and a single target portal group. Second, all connections within an iSCSI session may be associated with a single target portal group. A target portal group may define a set of network portals that collectively support the capability of coordinating a session with connections spanning these portals. Not all network portals within a target portal group need to participate in every session connected through that target portal group. One or more target portal groups may provide access to a particular node.

Each of the nodes 112X-Y may comprise one or more computing devices with one or more processors communicatively coupled to memory devices and input/output (I/O) devices, as described in more details herein below with references to FIG. 7. Nodes 112X-Z may be external to the distributed storage system 110, as shown in FIG. 1. Alternatively, one or more of nodes 112X-Z may be internal to the distributed storage system 110 may function as a storage node and also as a client of distributed storage system 110. Each of nodes 112X-Z may communicate with one or more nodes 112A-C to add, remove, access, or modify storage units 114A-C.

Nodes 112 A-Z may communicate with one another over an indirect connection or a direct connection. An indirect connection between nodes may include a combination of one or more communication channels that pass through an intermediate node. For example, an indirect connection between node 112A and node 112X may involve a first communication channel between node 112A and node 112B and a second communication channel between node 112B and node 112X. A direct connection may be connection in which node 112X has a communication channel between itself and a node (e.g., 112A) without traversing an intermediate node.

Nodes 112 X-Z may support one or more data transfer protocols to access the storage units and to export storage units. For example, a first protocol may enable the node to access content of distributed storage system 110 and a second protocol may enable the node to export the content to clients 130A-Z. In one example, the second protocol may be a part of a storage access service that exports the storage units of the distributed storage system 110 over a network (e.g., intranet, internet). The storage access service may run at any level of privilege, such as running as part of a kernel (e.g., kernel mode supervisor, master, privileged mode) or as part of a user space (e.g., application space, user mode). The storage access service may be packaged with an operating system or may be added or installed to an existing operating system.

Examples of the storage access service may include a block access service, a file access service, or a combination thereof. The block access service may be the same or similar to an internet Small Computer Systems Interface (iSCSI), a Fibre Channel over Ethernet (FCoE), ATA-over-Ethernet (AoE), other data access protocol, or a combination thereof. The file access service may be the same or similar to a Network File System (NFS), Common Interconnected File System (CIFS), Server Message Block (SMB), Apple Filing Protocol (AFP), NetWare Core Protocol (NCP), other data access technology, or a combination thereof.

Storage session 126 may be an interactive information interchange between one or more of the clients 130A-Z and one or more storage gateway nodes of distributed storage system 110 (e.g., nodes 112X-Z). Storage session 126 may be initiated via a request transmitted by clients 130A-Z, nodes 112A-Z, or a combination thereof. After the storage session 126 is initiated it may be established through back and forth communication between the client and the corresponding storage gateway. Each storage session may correspond to session data that may indicate the storage resources associated with the storage sessions. The session data may include session identification data, object identification data, lock data, object handle data, permission data, device data, other data, or a combination thereof. Session data may be stored in persistent data storage, non-persistent storage, or a combination thereof. Each storage session may correspond to session data stored on the clients 130A-Z, on the nodes 112X-Z, or a combination thereof.

Clients 130A-Z may be computing devices that access data exported by the storage exporting features of nodes 112X-Z. Clients 130A-Z may each include a client portion of the object access service (e.g., standardized storage access technology) and may function as a client (e.g., storage consumer) of one or more of the nodes 112X-Z (e.g., storage gateways). The client portion of the object access service may execute at any level of privilege such as running as part of a kernel or in a kernel mode (e.g., supervisor, master, privileged mode) or as part of a user space in user mode. Object access service may be packaged with an operating system or may be added or installed to an existing operating system. In one example, object access service may include a mount process (e.g., daemon, service) that runs on clients 130A-Z and may support an operating systems native API. The native API may be any standardized or proprietary operating system API, such as the Portable Operating System Interview (POSIX) API or the Microsoft Windows® API.

Clients 130A-Z may be physical devices (e.g., physical machines), virtual devices (e.g., virtual machines, containers), or a combination thereof. The below description of clients 130A-Z may also apply to nodes 112A-Z and one of the clients 130A-Z may function as a node, a client, a server, or a combination thereof. One or more of the clients (e.g., 130C and 130Z) may be absent virtualization technology and one or more of the clients (e.g., 130A and 130B) may provide one or more levels of virtualization. The levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Client 130A may provide hardware level virtualization by running a hypervisor 134 that provides hardware resources to one or more virtual machines 136. Hypervisor 134 may be any program or combination of programs and may run directly on the hardware (e.g., bare-metal hypervisor) or may run on or within a host operating system (not shown). Hypervisor 134 may manage and monitor various aspects of the operations of the computing device, including the storage, memory, and network interfaces. The hypervisor may abstract the physical layer features such as processors, memory, and I/O devices, and present this abstraction as virtual devices to a virtual machine 136 executing a guest operating system 138.

Guest operating system 138 may be any program or combination of programs that are capable of managing computing resources of virtual machine 136 and/or client 130B. Guest operating system 138 may include a kernel comprising one or more kernel space programs (e.g., memory driver, network driver, file system driver) for interacting with virtual hardware devices or actual hardware devices. In one example, guest operating system 138 may include Linux®, Solaris®, Microsoft Windows®, Apple Mac®, other operating system, or a combination thereof.

Client 130B may be similar to client 130A and may provide operating system level virtualization by running a computer program that provides computing resources to one or more containers 133A-B. Operating system level virtualization may be implemented within the kernel of operating system 132 and may enable the existence of multiple isolated containers. In one example, operating system level virtualization may not require hardware support and may impose little to no overhead because programs within each of the containers may use the system calls of the same underlying operating system 132. This may enable client 130B to provide virtualization without the need to provide hardware emulation or be run in an intermediate virtual machine as may occur with hardware level virtualization. Operating system level virtualization may provide resource management features that isolate or limit the impact of one container (e.g., container 133A) on the resources of another container (e.g., container 133B).

The operating system level virtualization may provide a pool of computing resources that are accessible by container 133A and are isolated from one or more other containers (e.g., container 133B). The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the containers activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 132 may include an operating system virtualizer that may provide containers 133A-B with access to computing resources. The operating system virtualizer may wrap one or more processes (e.g., of a particular service) in a complete file system that contains the code, runtime, system tools, system libraries, and other data present on the device (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof that automates the packaging, deployment, and execution of applications inside containers.

Each of the containers 133A-B may refer to a resource-constrained process space of client 130C that can execute functionality of a program. Containers 133A-B may be referred to as a user-space instances, a virtualization engines (VE), or jails and may appear to a user as a standalone instance of the user space of operating system 132. Each of the containers 133A-B may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers."

Pod 135 may be a data structure that is used to organize one or more containers 133A-B and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same client 130C. In another example, the containers associated with a particular pod may be located on different clients that are on the same or different physical machines.

Computing environment 100 may include one or more networks. The one or more networks may include a public network (e.g., the internet), a private network (e.g., a local area network (LAN) or wide area network (WAN)), or a combination thereof. In one example, the network may include a wired or a wireless infrastructure, which may be provided by one or more wireless communications systems, such as a wireless fidelity (WiFi) hotspot connected with the network and/or a wireless carrier system that can be implemented using various data processing equipment, communication towers, etc.

Figure 2:
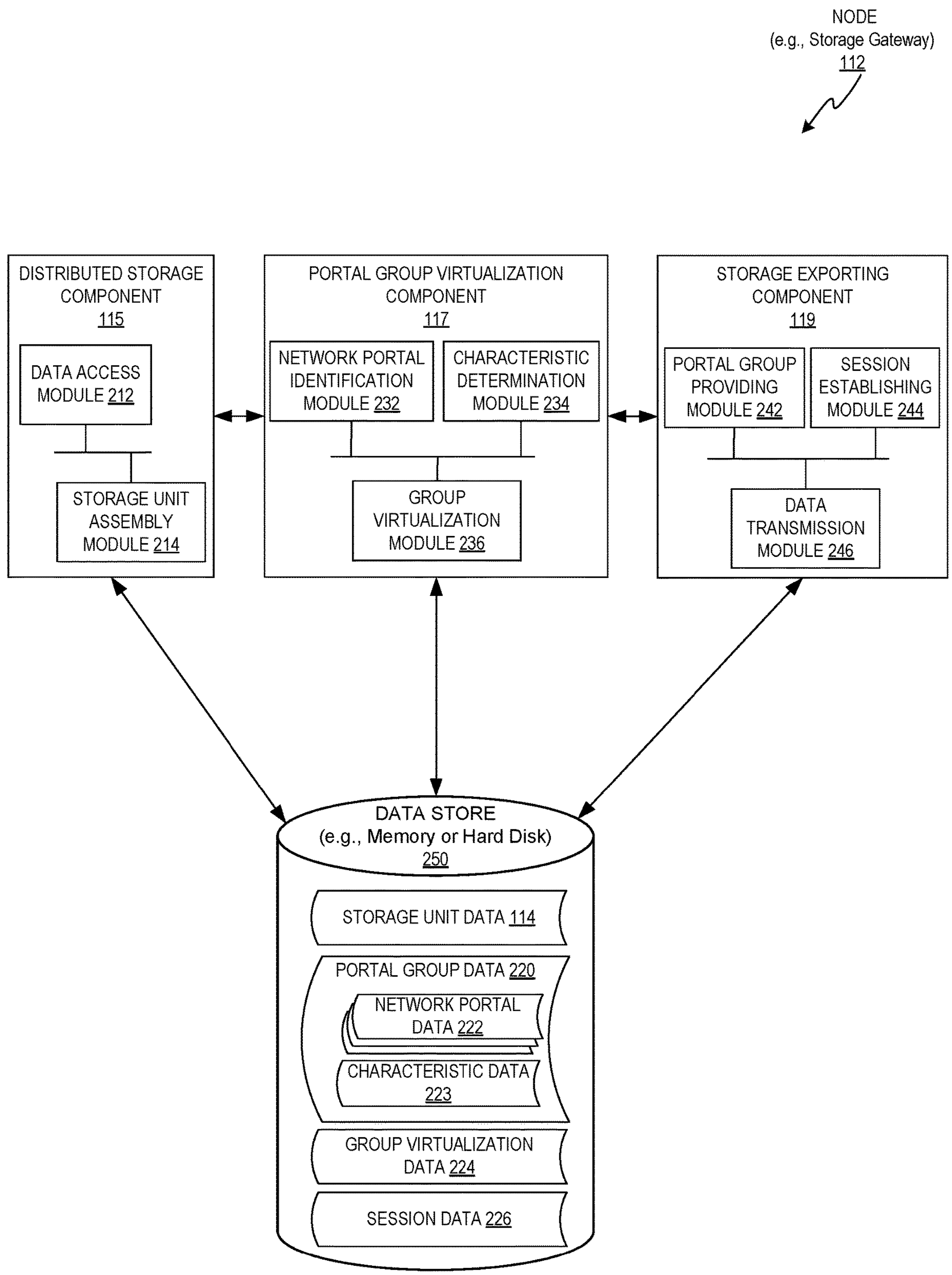
FIG. 2 depicts a block diagram of an example client with one or more components and modules, in accordance with one or more aspects of the present disclosure.

FIG. 2 is a block diagram illustrating example components and modules of node 112, in accordance with one or more aspects of the present disclosure. Node 112 may be the same or similar to one or more of the nodes 112X-Z of FIG. 1. The components, modules, or features discussed in regards to node 112 may be consolidated to a single computing device or may be spread across multiple computing devices (e.g., a cluster of nodes). In the example shown in FIG. 2, node 112 may include a distributed storage component 115, a portal group virtualization component 117, a storage exporting component 119, and a data store 250.

Distributed storage component 115 may enable node 112 to access storage unit data from the distributed storage system and store it as storage unit data 114 in data store 250. Distributed storage component 115 may be a portion of a client application, operating system, kernel driver, basic input/output system (BIOS), other features, or a combination thereof. In one example, distributed storage component 115 may include a data access module 212 and a storage unit assembly module 214.

Data access module 212 may enable node 112 to identify which portions of the distributed storage system are storing the data for a particular storage unit. Data for a single storage unit may be spread across multiple nodes of the distributed storage system. In one example, data access module 212 may determine which nodes store the data for a particular storage unit and may contact each of the corresponding nodes. In another example, node 112 may identify a particular node (e.g., lead node) of the distributed storage system that has access to the one or more nodes that store data of the particular storage unit. Data access module 212 may then communicate with the particular node without contacting each of the individual nodes. The particular node will contact the corresponding one or more nodes that store data of the particular storage unit and provide the data to node 112.

Storage unit assembly module 214 may enable node 112 to assemble the data retrieved from the distributed storage system and present it to clients as storage unit data 114. The storage units used by the distributed storage system may be the same or different from the storage units provided to the client. As discussed above, the storage units stored by the distributed storage system may include one or more blocks, files, records, objects, other data structures, or a combination thereof. The storage units provided by node 112 to the clients may also include one or more blocks, files, records, objects, other data structures, or a combination thereof. In one example, the distributed storage system may store data as first storage units (e.g., storage objects, blobs, or records) and node 112 may export the data as second storage units (e.g., storage blocks). Storage unit assembly module 214 may receive data from the distributed storage system in the form of first storage units and may transform and export the data as second storage units. The first and second storage units may be the same or different.

Portal group virtualization component 117 may enable node 112 to provide multiple different virtualized versions of a portal group that provides networking interfaces for clients to access the distributed storage system. In one example, portal group virtualization component 117 may include a network portal identification module 232, a characteristic determination module 234, and a group virtualization module 236.

Network portal identification module 232 may identify a set of network portals that are available for accessing the storage units. The set of network portals may include one or more network portals on one or more storage gateway nodes and may be represented by network portal data 222. In one example, network portal identification module 232 may access a configuration file that indicates which network portals are available. The configuration file may be provided by IT administrators, software developers, other users, or a combination thereof. In another example, network portal identification module 232 may scan one or more nodes of the distributed storage system to identify network portals that are available. In either example, each network portal may correspond to a particular virtual or physical network adapter of a node (e.g., IP address and port combination) and may be associated with particular characteristics.

Characteristic determination module 234 may determine the characteristics associated with a portal group and store the characteristics as characteristic data 223. Characteristic data 223 may be associated with a specific network portal, a subset of network portals, or the entire set of network portals. The characteristics may relate to the capacity of computing resources for a node, a networking device, a storage device, other device, or a combination thereof. The capacity may relate to bandwidth, latency, buffer size, processing speed, I/O capacity, storage space, other computing resources, or a combination thereof. Characteristic data 223 may be used to select one or more of the network portals as a primary network portal (e.g., preferred network portal), an auxiliary or secondary network portal (e.g., backup or standby network portal), or a combination thereof. In one example, the storage gateway (e.g., node 112) may analyze the characteristic data 223 and determine which network portal is a preferred network portal. In another example, the client accessing the storage gateway may analyze the characteristic data 223 to determine which network portal is preferred. In either example, the characteristic data 223 may be updated to include one or more primary network portals, auxiliary network portals, or a combination thereof.

Group virtualization module 236 may create a portal group and one or more virtual portal groups. Each virtual portal group may be an example of a portal group and may comprise the same or similar portal group data structure discussed above. Therefore, the data structure for a virtual portal group may include network portal data 222, characteristic data 223, or a combination thereof. The virtual portal groups may collectively represent multiple different variations of the portal group. A virtual portal group may be identical to the portal group or may include one or more modifications. The modification may alter the characteristic data 223 and/or the network portal data 222, which may result in respective client recipients selecting different network portals for their multipath connections. In one example, each of the virtual portal groups may each include the same network portals but the characteristics associated with the network portals may be modified. For example, the bandwidth, latency, or preferred portal may be modified between different virtual portal groups even though the underlying network portals remain unchanged across the different clients. One or more of the virtual portal groups may include or exclude a network portal present in another virtual portal group. The variations between virtual portal groups may be reflected by group virtualization data 224.

Group virtualization data 224 may represent the variations between the virtual portal groups and indicate which clients are associated with which virtual portal groups. As discussed above, a virtual portal group may be specific to a client or may be shared by one or more clients. Group virtualization data 224 may include mapping data that maps a virtual portal group with one or more client and/or one or more client with one or more virtual groups. Group virtualization data 224 may be updated by a user (e.g., IT administrator) or automatically by the node or distributed storage system to distribute clients across multiple storage gateway nodes.

Storage exporting component 119 may enable node 112 to export the data accessed from the distributed storage system to one or more clients that will consume the data. In one example, storage exporting component 119 may include a portal group providing module 242, a session establishing module 244, and a data transmission module 246.

Portal group providing module 242 may access data of portal group virtualization component 117 and provide to the clients the portal group data 220 corresponding to the virtual portal groups. Portal group providing module 242 may access portal group data 220 and group virtualization data 224 from within the distributed storage system and it may be synchronized and shared by the one or more of the storage gateways. This may enable the storage gateway nodes to ensure that the same virtual portal group is provided to a respective client independent of which storage gateway the client is communicating with. This is important since a client using a particular portal group may communicate with multiple storage gateway nodes. In one example, portal group providing module 242 may be aware portal group data 220 corresponds to a virtual portal group or it may be unaware it corresponds to a virtual portal group. For example, portal group providing module 242 may access data of the virtual portal group but be unable to detect that it is not a standard portal group (e.g., non-virtual portal group).

Portal group providing module 242 may provide the portal group data 220 in response to receiving a request from a particular client. The request may include client data for identifying the requesting client (e.g., IP address, computer name, iSCSI identifier) and the client data may be used to determine the network portal data 222 to send to the client. In one example, selecting which portal group data 220 to send to a client will be dynamically determined after receiving the client request. This may enhance load distribution across the network portals of a single storage gateway node or across multiple storage gateway nodes. In another example, selecting the portal group data 220 may be based on a static mapping that is determined in view of user input prior to the client transmitting the request. In either example, the client request may be the same or similar to a report target port groups (RTPG) command transmitted by a iSCSI initiator (storage client) to an iSCSI target (e.g., storage exporter).

In one example, node 112 may support the iSCSI protocol and the features of Asymmetric Logical Unit Access (ALUA). Asymmetric access may occur when the access characteristics of one network portal (e.g., storage connection) differ from those of another network portal. ALUA is an industry standard protocol for indicating asymmetric access and identifying primary or preferred paths between a storage system and a node. ALUA enables the initiator to query the target about path characteristics, such as a primary path (e.g., direct path via storage processor/controller that owns the storage unit) and an auxiliary path (e.g., indirect path via storage processor/controller that does not own the LUN). ALUA may enable the node 112 (e.g., target) to communicate events back to the client (e.g., initiator).

Session establishing module 244 may enable node 112 to establish a storage session with one or more clients. The storage session may be an interactive information interchange that occurs over one or more network connections between nodes and clients. A storage session may be established for each client and may enable the node of the distributed storage system (e.g., distributed storage client or server) to identify which clients are accessing which storage units. Multiple clients may access the same storage unit and the storage sessions may assist in managing access to the storage units to handle attempts to simultaneously access or update storage units. Each storage session may be associated with session data 226 that indicates information about the client or node 112 and may be stored by the client, node 112, or other node of the distributed storage system, or a combination thereof.

Session data 226 may be a data structure that indicates some or all of the storage units that are associated with one or more storage sessions. Session data 226 may include information about the one or more processes, users, clients, nodes, or a combination thereof that are associated with the storage units. In one example, session data 226 may include unit identification data, permission data, lock data, open unit data, user data, device data, other data, or a combination thereof. The unit identification data may include a data structure (e.g., an identifier or pointer) that uniquely identifies a storage unit within the distributed storage system. The unit identification data may include numeric data, non-numeric data, or a combination thereof and may provide one or more location addressable identifiers (e.g., unit name or storage location) or content addressable identifiers (e.g., hash of unit content). The permission data may indicate the permissions associated with a storage unit and may indicate whether the client can access or modify a storage unit. The lock data may include data associated with a locking data structure that represents a locking state of a storage unit (e.g., locked, unlocked, waiting). The open unit data may include data associated with a set of opened storage units (e.g., opened files) and may include data of one or more handle data structures (e.g., file handles) that represent a unit that is able to be accessed (e.g., readable, writable, executable). The lock data and open unit data may enable the client or the distributed storage system to coordinate access or modifications of a storage unit across multiple clients. The user data and device data may be associated with an account (e.g., user account and/or device account) and may indicate information about a device providing, exporting, or consuming the storage unit.

The storage session may be initiated by any device. For example, the storage session may be initiated by the client (e.g., iSCSI initiator) or the storage session may be initiated by node 112 (e.g., iSCSI target). In either example, subsequent communication by both the client and node 112 may be transmitted to establish a storage connection. The storage session may include multiple storage connections and each storage connection may function as a storage path between the client and the data in the distributed storage system. A storage session that includes multiple storage connections between a client and one or more storage gateway nodes may be referred to as a multiple path storage session.

Data transmission module 246 may enable node 112 to transmit data of the distributed storage system to one or more clients that are absent a client portion of the distributed storage system. As discussed above, node 112 may use multiple storage access services to access data and may export data using any of the storage access services discussed above (e.g., block access service, file access service). In one example, data transmission module 246 may transmit storage unit data 114 retrieved from distributed storage component 115 in response to one or more IO commands (e.g., SCSI commands) received from the client and may transmit the results of the commands back to clients.

Each of the clients may establish a storage session that includes multiple paths and the data may be transmitted over one or more of the multiple paths. The multiple paths may provide asymmetric access, symmetric access, other access, or a combination thereof. Asymmetric access may occur when the access characteristics of one storage path (e.g., first network portal) differs from those of another storage path (e.g., second network portal). Symmetric access may occur when the access characteristics of one storage path (e.g., first network portal) are the same or similar to the other storage paths (e.g., second network portal). In either example, the multiple paths may be used in an active/active arrangement or in an active/passive arrangement. An active/active arrangement may occur when at least two of the paths are actively processing IO requests (e.g., round robin) and therefore the multiple paths are operating simultaneously (e.g., concurrently) to process storage requests for a client. An active/passive arrangement may occur when a first path is active (e.g., primary or preferred path) and the remaining paths are passive (e.g., backup or standby paths). If the first path fails (e.g., degraded performance) one of the remaining paths may become active and replace the failing path.

Figure 3:
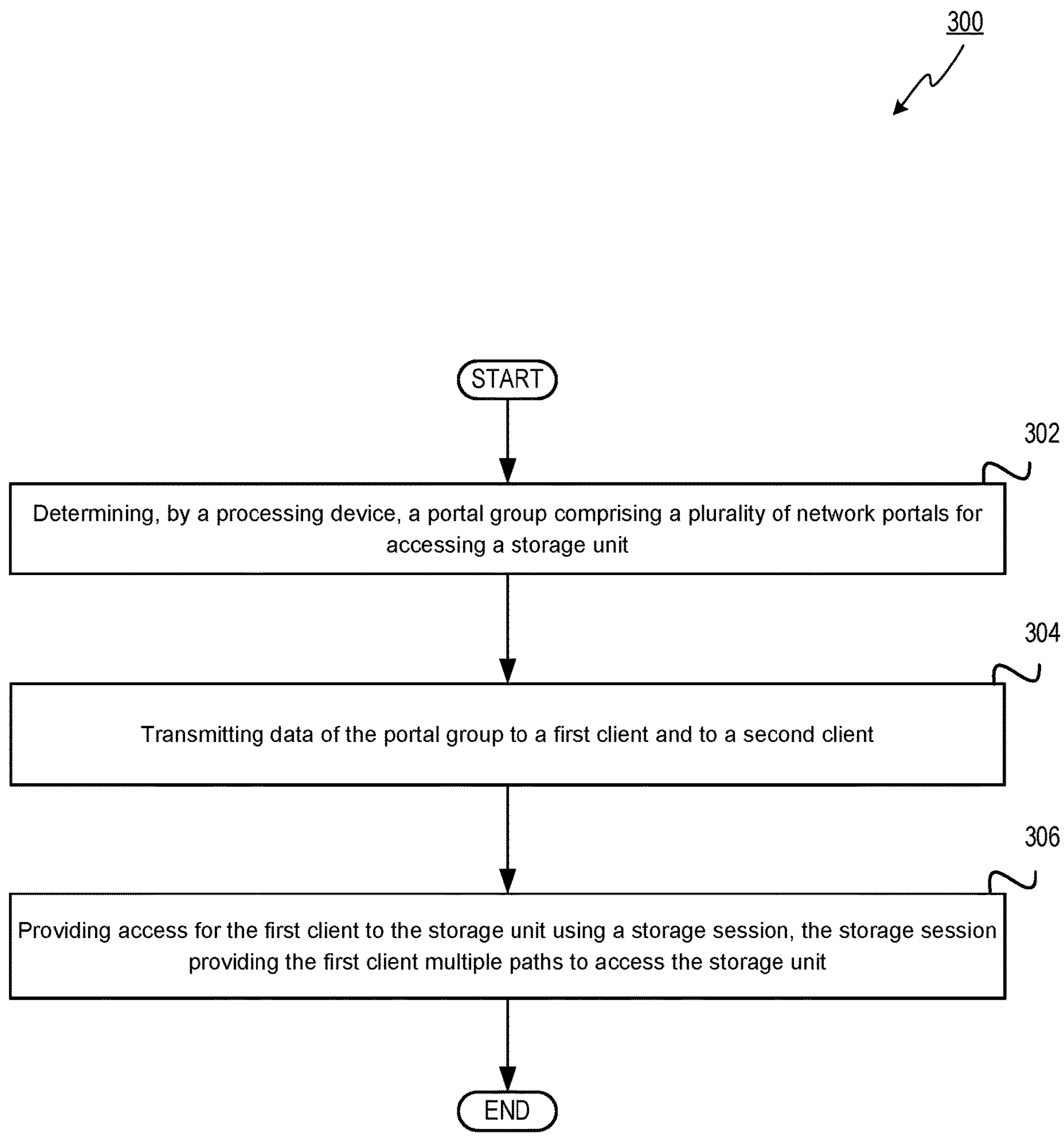
FIG. 3 depicts a flow diagram of an example method for accessing distributed storage using virtual portal groups, in accordance with one or more aspects of the present disclosure.

FIG. 3 depicts a flow diagram of one illustrative example of a method 300 for accessing distributed storage using virtual portal groups, in accordance with one or more aspects of the present disclosure. Method 300 and each of its individual functions, routines, subroutines, or operations may be performed by one or more processors of the computer device executing the method. In certain implementations, method 300 may be performed by a single computing device. Alternatively, method 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by components 115, 117, and/or 119 of FIG. 2.

Method 300 may be performed by processing devices of a client device or server device of a distributed storage system and may begin at block 302. At block 302, a processing device may determine a portal group that includes a plurality of network portals for accessing a storage unit. The data for the storage unit may be stored on a plurality of nodes of a distributed storage system. In one example, the processing device may receive the portal group from a node of the distributed storage system and the portal group may include a plurality of network portals for accessing the storage unit. A first network portal and a second network portal may each include a network address and a port number associated with a physical or virtual networking interface (e.g., network adapter or network interface card (NIC)) of a storage gateway node.

At block 304, the processing device may transmit data of the portal group to a first client and to a second client. The data of the portal group may indicate multiple paths for a client (e.g., storage consumer) to access the storage unit. The portal group may include a plurality of network portals for accessing the storage unit and data indicating characteristics of each of the plurality of network portals. Transmitting data of the portal group may involve transmitting a first virtual portal group to the first client and transmitting a second virtual portal group to the second client. The first virtual portal group and the second virtual portal group may each identify the same plurality of network portals but may indicate different preferred network portals, standby network portals, or a combination thereof. In one example, the portal group may identify a set of hardware interfaces that provide access to the storage unit and the data provided to each of the clients may correspond to a different virtualized group of the hardware interfaces.

At block 306, the processing device may provide access for the first client to the storage unit using a storage session. The storage session may provide the first client multiple paths to access the storage unit, wherein one of the multiple paths comprises the first network portal. The processing device may establish the storage session in response to receiving a request from the first client to initiate a storage session that uses the first network portal. The resulting storage session may include multiple paths of the client to the storage unit over at least two of the plurality of network portals of the portal group. In one example, the storage session may be an iSCSI session providing access to a distributed storage system comprising data of the storage unit and the storage unit may correspond to block storage associated with a Logical Unit Number (LUN). Responsive to completing the operations described herein above with references to block 306, the method may terminate.

Figure 4:
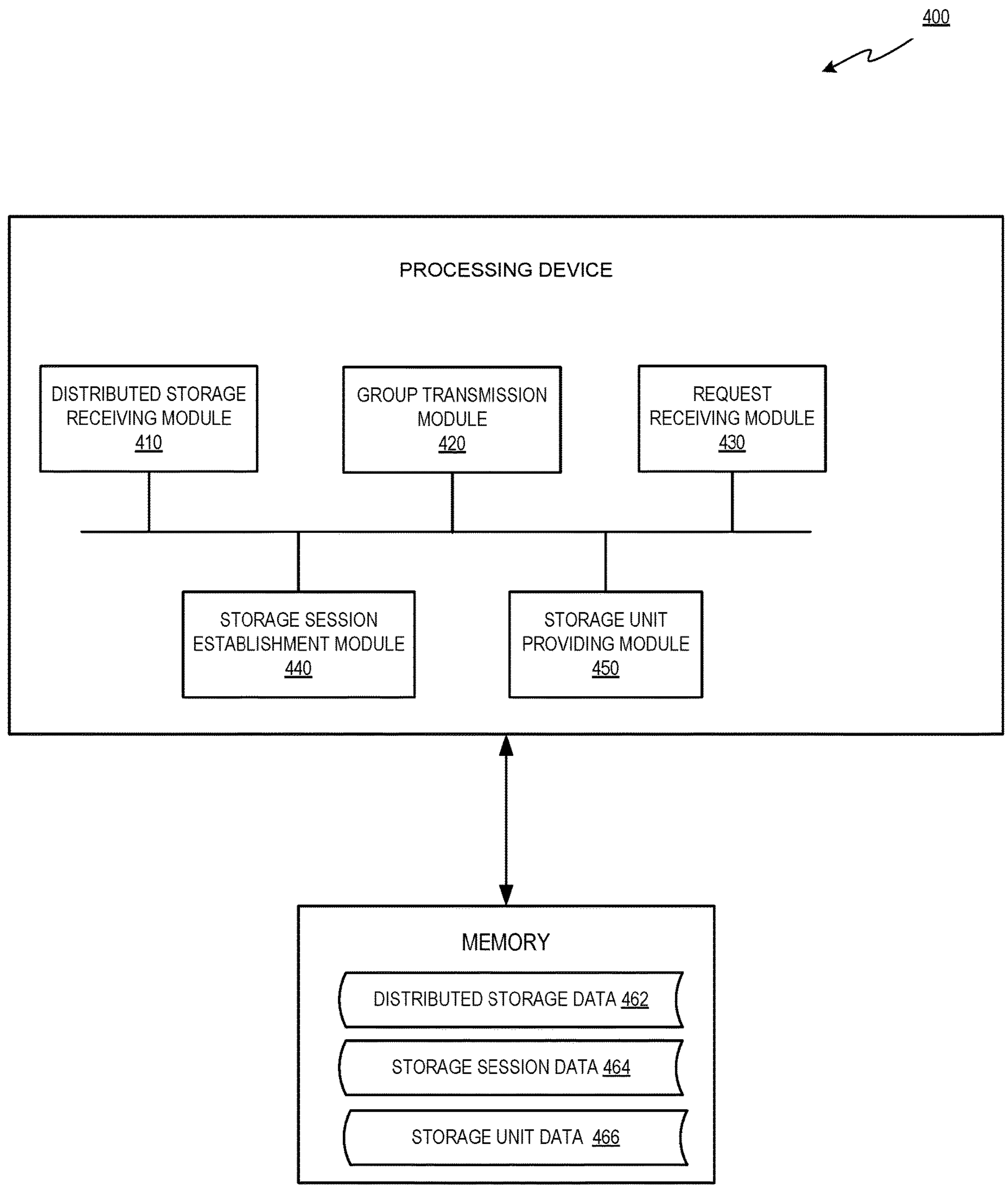
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer device 600 or 800 and may include one or more processing devices and one or more memory devices. In the example shown, computer system 400 may include a distributed storage receiving module 410, a group transmission module 420, a request receiving module 430, a storage session establishment module 440, and a storage unit providing module 450.

Distributed storage receiving module 410 may enable a processing device to receive a portal group from a node of a distributed storage system. The portal group may include a plurality of network portals for accessing a storage unit. The data for the storage unit may be stored on a plurality of nodes of a distributed storage system (e.g., distributed storage data 462). In one example, the processing device may receive the portal group from a storage gateway node of the distributed storage system and the portal group may include a plurality of network portals of multiple different storage gateway nodes. The network portals may include a first network portal and a second network portal and each may include a network address and a port number. The network address and port number may be associated with a physical or virtual networking interface of a storage gateway node (e.g., network adapter or network interface card (NIC)).

Group transmission module 420 may enable the processing device to transmit data of the portal group to a first client and to a second client. Data transmitted to the first client may indicate a first network portal is preferred and data transmitted to the second client may indicate a second network is preferred. The portal group may include a plurality of network portals for accessing the storage unit and data indicating characteristics of each of the plurality of network portals. In one example, transmitting data of the portal group may involve transmitting a first virtual portal group to the first client and transmitting a second virtual portal group to the second client. The first virtual portal group and the second virtual portal group may each identify the same plurality of network portals but may indicate different preferred network portals, standby network portals, or a combination thereof. In another example, the portal group may identify a set of hardware interfaces that provide access to the storage unit and the data provided to each of the clients may correspond to a different virtualized group of the hardware interfaces.

Request receiving module 430 may enable the processing device to receive a request from the first client to initiate a storage session that uses the first network portal. The request may include client data for identifying the requesting client (e.g., IP address, computer name, iSCSI identifier) and the client data may be used to determine the portal group or the network portals to include in the portal group. In one example, selecting which network portals for a client to use may be dynamically determined after receiving the client request. This may enhance load distribution across the network portals of a single storage gateway node or across multiple storage gateway nodes. In another example, selecting the network portals may be based on a static mapping that is determined in view of user input prior to the client transmitting the request.

Storage session establishment module 440 may enable the processing device to establish the storage session. The storage session may include storage session data 464 indicating multiple paths to the storage unit over at least two of the plurality of network portals. The processing device may establish the storage session in response to receiving the request from the first client to initiate a storage session.

Storage unit providing module 450 may enable the processing device to provide data of the storage unit (e.g., storage unit data 466) to the first client using the storage session. The storage session may provide the first client multiple paths to access the storage and one of the multiple paths may include the first network portal. In one example, the storage session may be an iSCSI session providing access to a distributed storage system that includes the data of the storage unit. The storage unit may correspond to block storage associated with a Logical Unit Number (LUN).

Figure 5:
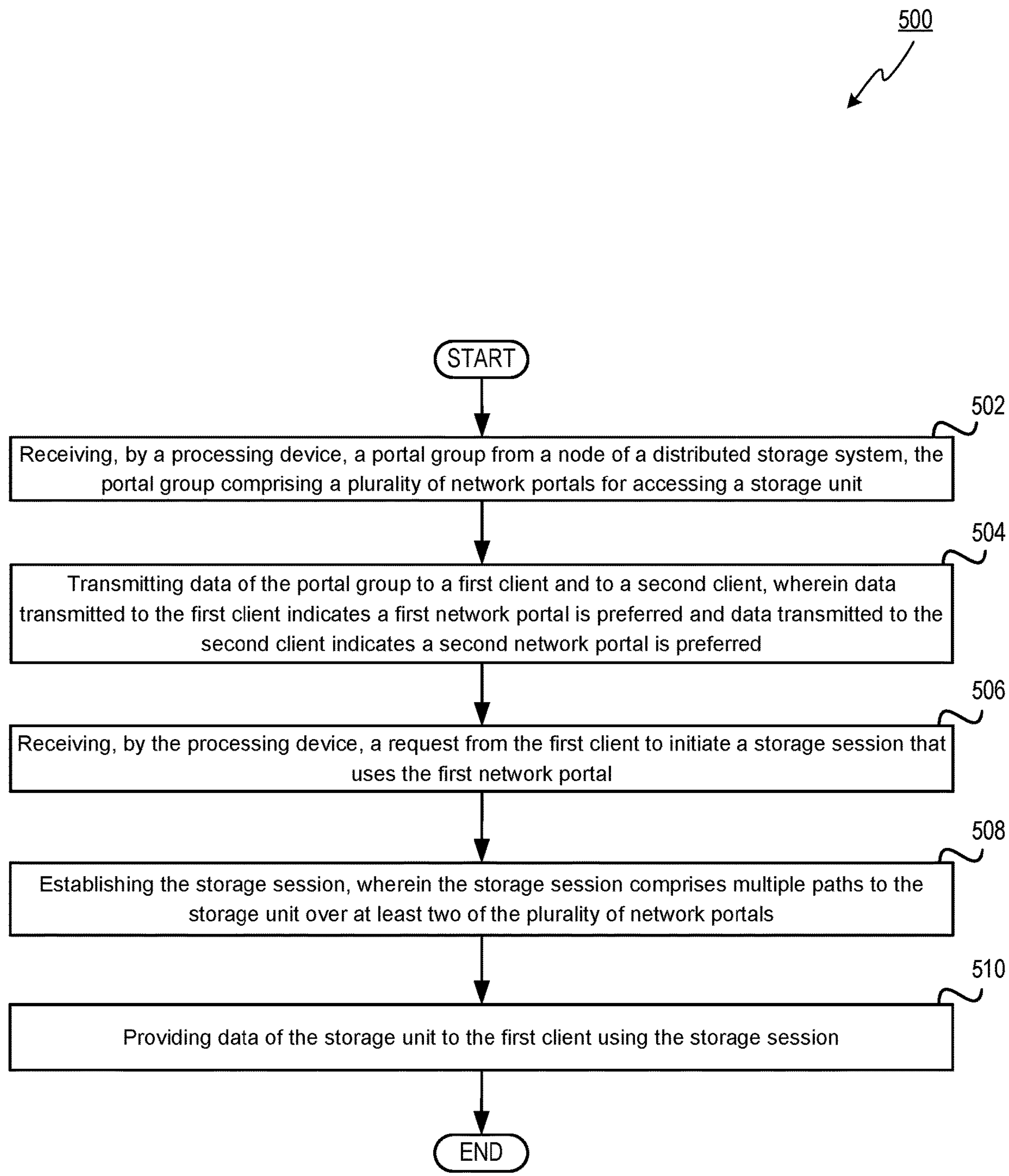
FIG. 5 depicts a flow diagram of another example method for accessing distributed storage using virtual portal groups, in accordance with one or more aspects of the present disclosure.

FIG. 5 depicts a flow diagram of one illustrative example of a method 500 for accessing distributed storage using virtual portal groups, in accordance with one or more aspects of the present disclosure. Method 500 may be similar to method 300 and each of its individual functions, routines, subroutines, or operations may be performed by one or more processors of the computer device executing the method. Method 500 may be performed by processing devices of a client device or server device of a distributed storage system and may begin at block 502.

At block 502, a processing device may receive a portal group from a node of a distributed storage system. The portal group may include a plurality of network portals for accessing a storage unit. The data for the storage unit may be stored on a plurality of nodes of a distributed storage system. In one example, the processing device may receive the portal group from a storage gateway node of the distributed storage system and the portal group may include a plurality of network portals of multiple different storage gateway nodes. The network portals may include a first network portal and a second network portal and each may include a network address and a port number. The network address and port number may be associated with a physical or virtual networking interface of a storage gateway node (e.g., network adapter or network interface card (NIC)).

At block 504, the processing device may transmit data of the portal group to a first client and to a second client. Data transmitted to the first client may indicate a first network portal is preferred and data transmitted to the second client may indicate a second network is preferred. The portal group may include a plurality of network portals for accessing the storage unit and data indicating characteristics of each of the plurality of network portals. In one example, transmitting data of the portal group may involve transmitting a first virtual portal group to the first client and transmitting a second virtual portal group to the second client. The first virtual portal group and the second virtual portal group may each identify the same plurality of network portals but may indicate different preferred network portals, standby network portals, or a combination thereof. In another example, the portal group may identify a set of hardware interfaces that provide access to the storage unit and the data provided to each of the clients may correspond to a different virtualized group of the hardware interfaces.

At block 506, the processing device may receive a request from the first client to initiate a storage session that uses the first network portal. The request may include client data for identifying the requesting client (e.g., IP address, computer name, iSCSI identifier) and the client data may be used to determine the portal group or the network portals to include in the portal group. In one example, selecting which network portals for a client to use may be dynamically determined after receiving the client request. This may enhance load distribution across the network portals of a single storage gateway node or across multiple storage gateway nodes. In another example, selecting the network portals may be based on a static mapping that is determined in view of user input prior to the client transmitting the request.

At block 508, the processing device may establish the storage session. The storage session may include multiple paths to the storage unit over at least two of the plurality of network portals. The processing device may establish the storage session in response to receiving the request from the first client to initiate a storage session.

At block 510, the processing device may provide data of the storage unit to the first client using the storage session. The storage session may provide the first client multiple paths to access the storage and one of the multiple paths may include the first network portal. In one example, the storage session may be an iSCSI session providing access to a distributed storage system that includes the data of the storage unit. The storage unit may correspond to block storage associated with a Logical Unit Number (LUN). Responsive to completing the operations described herein above with references to block 510, the method may terminate.

Figure 6:
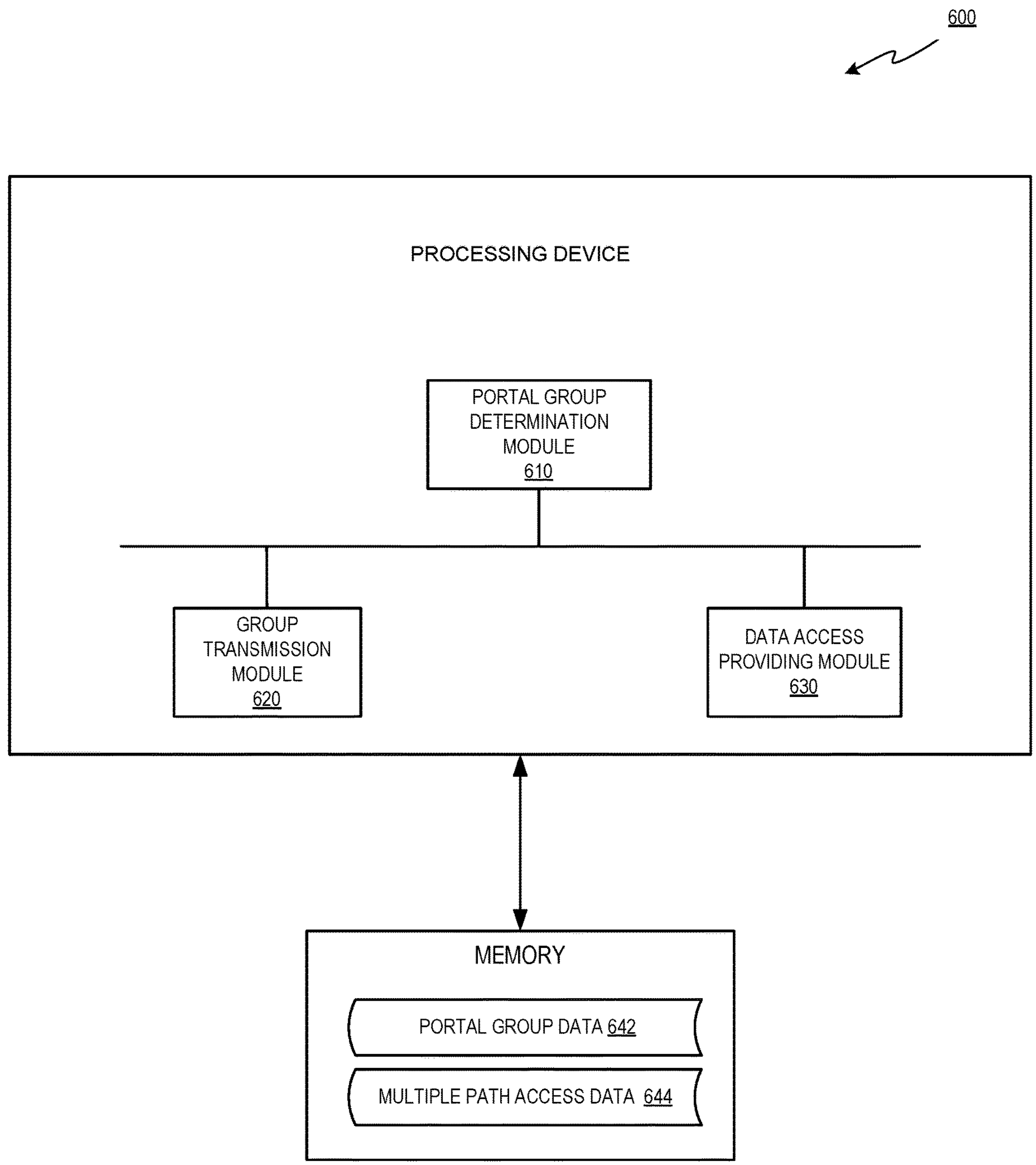
FIG. 6 depicts a block diagram of another example computer system in accordance with one or more aspects of the present disclosure.

FIG. 6 depicts a block diagram of a computer system 600 operating in accordance with one or more aspects of the present disclosure. Computer system 600 may include one or more processing devices and one or more memory devices. In the example shown, computer system 600 may include a portal group determination module 610, a group transmission module 620, and a data access providing module 630.

Portal group determination module 610 may enable a processing device to determine a portal group that includes a plurality of network portals for accessing a storage unit.

The data for the storage unit may be stored on a plurality of nodes of a distributed storage system. In one example, the processing device may receive the portal group from a node of the distributed storage system and the portal group may include a plurality of network portals for accessing the storage unit. A first network portal and a second network portal may each include a network address and a port number associated with a physical or virtual networking interface (e.g., network adapter or network interface card (NIC)) of a storage gateway node.

Group transmission module 620 may enable the processing device to transmit portal group data 642 of a virtual portal group to a first client and to a second client. The data of the portal group may indicate multiple paths for a client to access the storage unit (e.g., multiple path access data 644). The portal group may include a plurality of network portals for accessing the storage unit and data indicating characteristics of each of the plurality of network portals. Transmitting data of the portal group may involve transmitting a first virtual portal group to the first client and transmitting a second virtual portal group to the second client. The first virtual portal group and the second virtual portal group may each identify the same plurality of network portals but may indicate different preferred network portals, standby network portals, or a combination thereof. In one example, the portal group may identify a set of hardware interfaces that provide access to the storage unit and the data provided to each of the clients may correspond to a different virtualized group of the hardware interfaces.

Data access providing module 630 may enable the processing device to provide access for the first client to the storage unit using a storage session. The storage session may provide the first client multiple paths to access the storage unit, wherein one of the multiple paths comprises the first network portal. The processing device may establish the storage session in response to receiving a request from the first client to initiate a storage session that uses the first network portal. The resulting storage session may include multiple paths of the client to the storage unit over at least two of the plurality of network portals of the portal group. In one example, the storage session may be an iSCSI session providing access to a distributed storage system comprising data of the storage unit and the storage unit may correspond to block storage associated with a Logical Unit Number (LUN).

Figure 7:
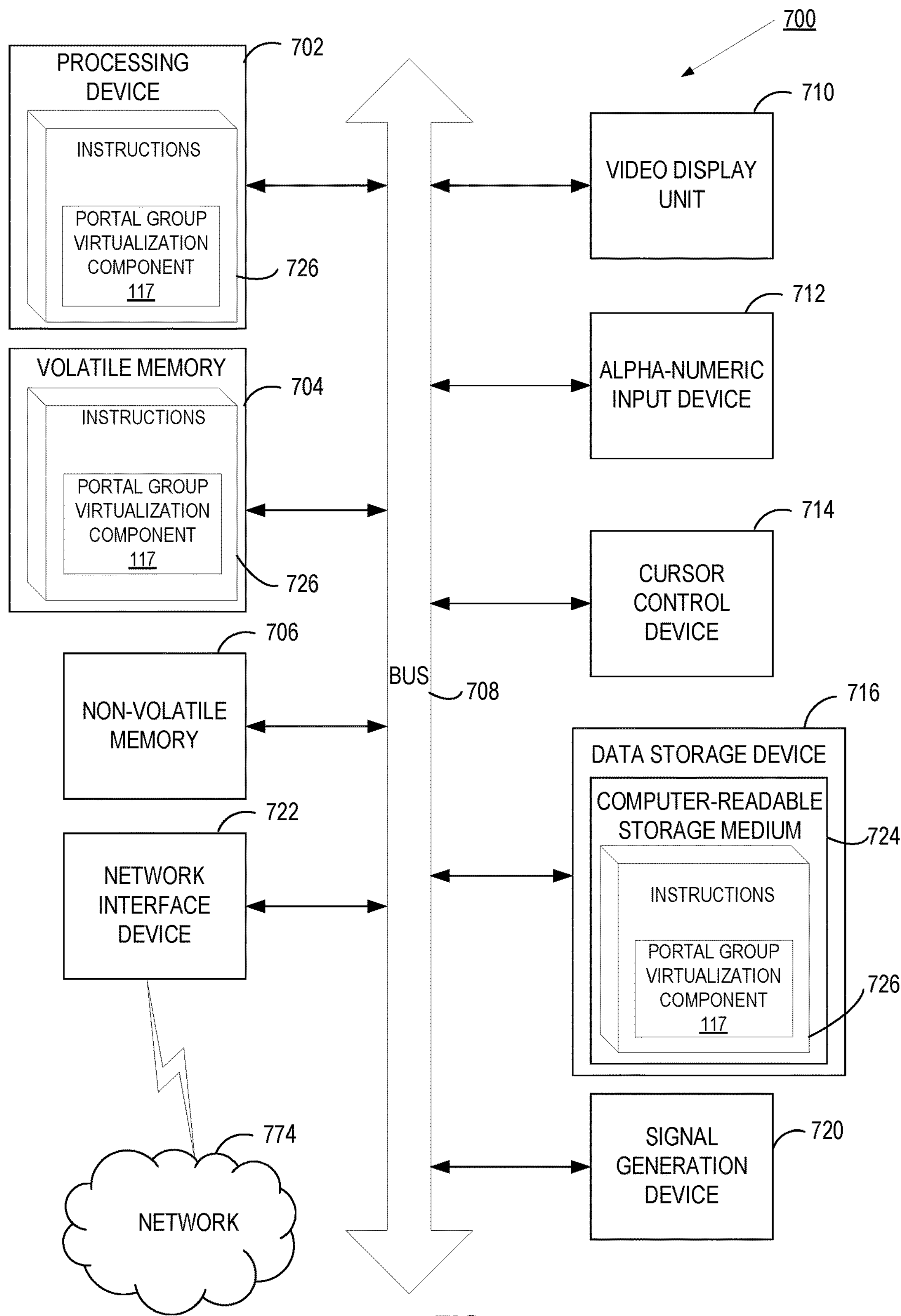
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to nodes 112A-Z or clients 130A-Z of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300 or 500 and for encoding portal group virtualization component 117 of FIG. 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: determining, by a processing device, a portal group comprising a plurality of network portals for accessing a storage unit; transmitting data of the portal group to a first client and to a second client, wherein data transmitted to the first client indicates a first network portal is preferred and wherein data transmitted to the second client indicates a second network portal is preferred; and providing access for the first client to the storage unit using a storage session, the storage session providing the first client multiple paths to access the storage unit, wherein one of the multiple paths comprises the first network portal.

Example 2 is the method of example 1, wherein the data of the portal group indicates the multiple paths for the first client to access the storage unit.

Example 3 is the method of example 1, wherein transmitting data of the portal group comprises transmitting a first virtual portal group to the first client and transmitting a second virtual portal group to the second client, wherein the first virtual portal group and the second virtual portal group each identify the same plurality of network portals and indicate different preferred network portals.

Example 4 is the method of example 1, wherein transmitting data of the portal group to the first client comprises transmitting data that indicates each of the plurality of network portals for accessing the storage unit and data indicating characteristics of the plurality of network portals.

Example 5 is the method of example 1, further comprising establishing the storage session with the first client, wherein the storage session is initiated by the first client and wherein each of the multiple paths corresponds to one of the plurality of network portals.

Example 6 is the method of example 1, wherein the storage session comprises an internet Small Computer Systems Interface (iSCSI) session providing access to data of a distributed storage system that comprises the storage unit.

Example 7 is the method of example 1, wherein the storage unit corresponds to block storage associated with a Logical Unit Number (LUN).

Example 8 is the method of example 1, wherein the first network portal and the second network portal each comprise a network address and a port number associated with a physical networking interface of a node of a distributed storage system.

Example 9 a system comprising: a memory; a processing device operatively coupled to the memory, the processing device to: receive a portal group from a node of a distributed storage system, the portal group comprising a plurality of network portals for accessing a storage unit; transmit data of the portal group to a first client and to a second client, wherein data transmitted to the first client indicates a first network portal is preferred and data transmitted to the second client indicates a second network portal is preferred; receive a request from the first client to initiate a storage session that uses the first network portal; establish the storage session, wherein the storage session comprises multiple paths to the storage unit over at least two of the plurality of network portals; and provide data of the storage unit to the first client using the storage session.

Example 10 is the system of example 9, wherein the data of the portal group indicates the multiple paths for the first client to access the storage unit.

Example 11 is the system of example 9, wherein transmitting data of the portal group comprises transmitting a first virtual portal group to the first client and transmitting a second virtual portal group to the second client, wherein the first virtual portal group and the second virtual portal group each identify the same plurality of network portals and indicate different preferred network portals.

Example 12 is the system of example 9, wherein transmitting data of the portal group to the first client comprises transmitting data that indicates each of the plurality of network portals for accessing the storage unit and data indicating characteristics of the plurality of network portals.

Example 13 is the system of example 9, wherein the storage session comprises an internet Small Computer Systems Interface (iSCSI) session providing access to data of the distributed storage system that comprises the storage unit.

Example 14 is the system of example 9, wherein the storage unit corresponds to block storage associated with a Logical Unit Number (LUN).

Example 15 is the system of example 9, wherein the first network portal and the second network portal each comprise a network address and a port number associated with a physical networking interface of a second node of the distributed storage system.

Example 16 is a non-transitory machine-readable storage medium storing instructions that cause a processing device to: determine a portal group comprising a plurality of network portals for accessing a storage unit; transmit data of the portal group to a first client and to a second client, wherein data transmitted to the first client indicates a first network portal is preferred and wherein data transmitted to the second client indicates a second network portal is preferred; and provide access for the first client to the storage unit using a storage session, the storage session providing the first client multiple paths to access the storage unit, wherein one of the multiple paths comprises the first network portal.

Example 17 is the non-transitory machine-readable storage medium of example 16, wherein transmitting data of the portal group to the first client comprises transmitting data that indicates each of the plurality of network portals for accessing the storage unit and data indicating characteristics of the plurality of network portals.

Example 18 is the non-transitory machine-readable storage medium of example 16, further comprising establishing the storage session with the first client, wherein the storage session is initiated by the first client and wherein each of the multiple paths corresponds to one of the plurality of network portals.

Example 19 is the non-transitory machine-readable storage medium of example 16, wherein the storage session comprises an internet Small Computer Systems Interface (iSCSI) session providing access to data of a distributed storage system that comprises the storage unit.

Example 20 is the non-transitory machine-readable storage medium of example 16, wherein the storage unit corresponds to block storage associated with a Logical Unit Number (LUN).

Example 21 a method comprising: receiving, by a processing device, a portal group from a node of a distributed storage system, the portal group comprising a plurality of network portals for accessing a storage unit; transmitting data of the portal group to a first client and to a second client, wherein data transmitted to the first client indicates a first network portal is preferred and data transmitted to the second client indicates a second network portal is preferred; receiving, by the processing device, a request from the first client to initiate a storage session that uses the first network portal; establishing the storage session, wherein the storage session comprises multiple paths to the storage unit over at least two of the plurality of network portals; and providing data of the storage unit to the first client using the storage session.

Example 22 is the method of example 21, wherein the data of the portal group indicates the multiple paths for the first client to access the storage unit.

Example 23 is the method of example 21, wherein transmitting data of the portal group comprises transmitting a first virtual portal group to the first client and transmitting a second virtual portal group to the second client, wherein the first virtual portal group and the second virtual portal group each identify the same plurality of network portals and indicate different preferred network portals.

Example 24 is the method of example 21, wherein the first network portal and the second network portal each comprise a network address and a port number associated with a physical networking interface of a second node of the distributed storage system.

Example 25 is the method of example 21, wherein transmitting data of the portal group to the first client comprises transmitting data that indicates each of the plurality of network portals for accessing the storage unit and data indicating characteristics of the plurality of network portals.

Example 26 is the method of example 21, further comprising establishing the storage session with the first client, wherein the storage session is initiated by the first client and wherein each of the multiple paths corresponds to one of the plurality of network portals.

Example 27 is the method of example 21, wherein the storage session comprises an internet Small Computer Systems Interface (iSCSI) session providing access to data of the distributed storage system that comprises the storage unit.

Example 28 is the method of example 21, wherein the storage unit corresponds to block storage associated with a Logical Unit Number (LUN).

Example 29 is an apparatus comprising: a means to determine a portal group comprising a plurality of network portals for accessing a storage unit; a means to transmit data of the portal group to a first client and to a second client, wherein data transmitted to the first client indicates a first network portal is preferred and wherein data transmitted to the second client indicates a second network portal is preferred; and a means to provide access for the first client to the storage unit using a storage session, the storage session providing the first client multiple paths to access the storage unit, wherein one of the multiple paths comprises the first network portal.

Example 30 is the apparatus of example 29, further comprising a means to establish the storage session with the first client, the storage session being initiated by the first client and each of the multiple paths corresponding to one of the plurality of network portals.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "transmitting," "providing," "establishing," "receiving," "identifying," "obtaining," "initiating," "accessing," "detecting," "generating," "creating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
- receiving a portal group from a node of a distributed storage system, the portal group comprising a plurality of network portals for accessing a storage unit;
- transmitting data of the portal group to a first client and to a second client, wherein data transmitted to the first client and data transmitted to the second client each identify the plurality of network portals and indicate a different preferred network portal;
- receiving a request from the first client to initiate a storage session that uses one of the plurality of network portals;
- establishing the storage session, wherein the storage session comprises multiple paths to the storage unit over at least two of the plurality of network portals; and
- providing data of the storage unit to the first client using the storage session.

2. The method of claim 1, wherein the data of the portal group indicates the multiple paths for the first client to access the storage unit.

3. The method of claim 1, wherein transmitting data of the portal group comprises transmitting a first virtual portal group to the first client and transmitting a second virtual portal group to the second client, wherein the first virtual portal group and the second virtual portal group each identify a same set of network portals and indicate a different network portal of the set is preferred.

4. The method of claim 1, wherein transmitting data of the portal group comprises transmitting data that indicates each of the plurality of network portals for accessing the storage unit and data indicating characteristics of the plurality of network portals.

5. The method of claim 1, wherein the storage session comprises an internet Small Computer Systems Interface (iSCSI) session providing access to data of the distributed storage system.

6. The method of claim 1, wherein the storage unit corresponds to block storage associated with a Logical Unit Number (LUN).

7. The method of claim 1, wherein the plurality of network portals comprises a network portal comprising a network address and a port number that are associated with a physical networking interface of a second node of the distributed storage system.

8. A system comprising:

a memory;

a processing device operatively coupled to the memory, the processing device to:

determine a portal group comprising a plurality of network portals for accessing a storage unit;

transmit data of the portal group to a first client and to a second client, wherein data transmitted to the first client and data transmitted to the second client each identify the plurality of network portals and indicate a different preferred network portal; and provide access for the first client to the storage unit using a storage session, the storage session providing the first client multiple paths to access the storage unit, wherein one of the multiple paths comprises one of the plurality of network portals.

9. The system of claim 8, wherein the data of the portal group indicates the multiple paths for the first client to access the storage unit.

10. The system of claim 8, wherein to transmit the data of the portal group to the first client and the second client, the processing device is further to transmit a first virtual portal group to the first client and to transmit a second virtual portal group to the second client, wherein the first virtual portal group and the second virtual portal group each identify a same set of network portals and indicate a different network portal of the set is preferred.

11. The system of claim 8, wherein to transmit the data of the portal group to the first client and the second client, the processing device is further to transmit data that indicates each of the plurality of network portals for accessing the storage unit and data indicating characteristics of the plurality of network portals.

12. The system of claim 8, wherein the processing device is further to establish the storage session with the first client, wherein the storage session is initiated by the first client and wherein each of the multiple paths corresponds to one of the plurality of network portals.

13. The system of claim 8, wherein the storage session comprises an internet Small Computer Systems Interface (iSCSI) session providing access to data of a distributed storage system.

14. The system of claim 8, wherein the storage unit corresponds to block storage associated with a Logical Unit Number (LUN).

15. The system of claim 8, wherein the plurality of network portals comprises a network portal comprising a network address and a port number that are associated with a physical networking interface of a node of a distributed storage system.

16. A non-transitory machine-readable storage medium storing instructions that cause a processing device to:

receive a portal group from a node of a distributed storage system, the portal group comprising a plurality of network portals for accessing a storage unit;

transmit data of the portal group to a first client and to a second client, wherein data transmitted to the first client and data transmitted to the second client each identify the plurality of network portals and indicate a different preferred network portal;

receive a request from the first client to initiate a storage session that uses one of the plurality of network portals;

establish the storage session, wherein the storage session comprises multiple paths to the storage unit over at least two of the plurality of network portals; and provide data of the storage unit to the first client using the storage session.

17. The non-transitory machine-readable storage medium of claim 16, wherein the data of the portal group indicates the multiple paths for the first client to access the storage unit.

18. The non-transitory machine-readable storage medium of claim 16, wherein to transmit the data of the portal group to the first client and to the second client, the processing device is to transmit a first virtual portal group to the first client and to transmit a second virtual portal group to the second client, wherein the first virtual portal group and the second virtual portal group each identify a same set of network portals and indicate a different network portal of the set is preferred.

19. The non-transitory machine-readable storage medium of claim 16, wherein to transmit the data of the portal group to the first client and to the second client, the processing device is to transmit data that indicates each of the plurality of network portals for accessing the storage unit and data indicating characteristics of the plurality of network portals.

20. The non-transitory machine-readable storage medium of claim 16, wherein the plurality of network portals comprises a network portal comprising a network address and a port number that are associated with a physical networking interface of a second node of the distributed storage system.

* * * * *